(12) United States Patent
Van De Water

(10) Patent No.: US 6,308,078 B1
(45) Date of Patent: Oct. 23, 2001

(54) TRANSMISSION TIME DELAY MEASUREMENT AT TRANSMISSION PATHS IN A RADIO TELECOMMUNICATION SYSTEM

(75) Inventor: Cornelis Van De Water, Enschede (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/331,871
(22) PCT Filed: Dec. 12, 1997
(86) PCT No.: PCT/EP97/07150
  § 371 Date: Sep. 22, 1999
  § 102(e) Date: Sep. 22, 1999
(87) PCT Pub. No.: WO98/29964
  PCT Pub. Date: Jul. 9, 1998

(30) Foreign Application Priority Data

Dec. 31, 1996 (EP) .................................................. 96203732

(51) Int. Cl.⁷ .................................................. H04B 7/00
(52) U.S. Cl. .......................................... 455/503; 455/67.6
(58) Field of Search ..................................... 455/502, 503, 455/59, 60, 67.1, 67.4, 67.6, 517, 524, 525

(56) References Cited

U.S. PATENT DOCUMENTS

| | | | |
|---|---|---|---|
| 4,709,401 | 11/1987 | Kesberg | 455/503 |
| 4,718,109 | 1/1988 | Breeden et al. | 455/503 |
| 5,128,925 | 7/1992 | Dornstetter et al. | 455/503 |

FOREIGN PATENT DOCUMENTS

| | | |
|---|---|---|
| 197556A2 | 10/1986 | (EP) . |
| 286614A1 | 10/1988 | (EP) . |
| 437835A1 | 7/1991 | (EP) . |
| 560079A1 | 9/1993 | (EP) . |
| 626796A1 | 11/1994 | (EP) . |
| WO94/28643 | 12/1994 | (WO) . |

*Primary Examiner*—Thanh Cong Le
(74) *Attorney, Agent, or Firm*—Burns, Doane, Swecker Mathis, L.L.P.

(57) ABSTRACT

In a cordless (e.g. DECT) or cellular radio telecommunication system (1), comprising a plurality of radio access units (3) operatively connecting to a central interface unit (2), transmission time delays at transmission paths (11, 12, 13) between the central interface unit (2) and the radio access units (3) are established from time differences measured between the transmission and reception of radio signals by adjacent radio access units (3). Synchronous operation at the air interface (9) is obtained by compensation of the time delays at the transmission paths (11, 12, 13).

19 Claims, 4 Drawing Sheets

TRANSMISSION TIME DELAY MEASUREMENT AT TRANSMISSION PATHS IN A RADIO TELECOMMUNICATION SYSTEM

FIELD OF THE INVENTION

The present invention relates to multi-cell mobile and cordless radio telecommunication systems and, more particularly, to the compensation of transmission time delays in such radio telecommunication systems.

BACKGROUND OF THE INVENTION

Cordless radio telecommunication systems, such as operating in accordance with the Digital Enhanced Cordless Telecommunications (DECT) or the Personal Handyphone System (PHS) standards and microcell cellular mobile radio communication systems operating in accordance with the Global System for Mobile communication (GSM) standard, for example, comprise a plurality of radio access units, each providing service to a relatively small area, generally having a radius from 10–100 m indoor and up till 5000 m for outdoor usage.

The radio access units are operatively connected to a central interface unit which, in turn connects to a Private Automatic Branche exchange (PABX), a Public Switched Telephone Network (PSTN) or an Integrated Services Digital Network (ISDN), for example.

Between the radio access units and remote subscriber units, such as a portable radio telephone, a duplex radio link can be established. While moving across the coverage or service area of the radio telecommunication system, the radio link is handed over from one radio access unit to the other if the remote unit leaves the coverage area of a particular radio access unit.

To allow handover of a call in progress from one radio access unit to the other without interruption and not requiring special equipment in the remote subscriber unit, it is required that the radio access units at their air interface operate synchronously. To this end, the radio access units receive relevant timing information from the central interface unit.

In practice, however, the radio access units connect to the central interface unit via transmission paths of different lengths. This, because some of the radio access units will be physically located further away from the central interface unit than others. Those skilled in the art will appreciate that timing information generated by the central interface unit and transmitted to the radio access units, due to propagation time delays at the transmission paths between the central interface unit and the radio access units, will arrive at the different radio access units at different points in time. Accordingly, compensation of such time delays is required in order to achieve the required synchronous operation at the air interface.

In a cordless radio telecommunication system presently available from applicant, after installation, the transmission time delays of the several transmission paths between radio access units and the central interface unit are measured separately and are manually entered into the system. In the case of very small systems, if the radio access units are connected by cable to the central interface unit, for example, cables of fixed length can be used, the transmission time delays of which are known and can be entered into the system.

This known method has a number of disadvantages. First, special equipment and trained personal are required for establishing the different time delays and entering same into the system. This can be a very time consuming task, in particular in the case of large systems wherein up till 120 radio access units can be connected to a signal central interface unit. Further, errors in the measurement of time delays or wrongly entered values will only be detected from complaints about the communication, once the radio telecommunication system is in operation. This of course being very annoying to users. Further, the radio access units, after their installation, can not be immediately connected to the transmission cable, or other transmission medium, because first the transmission time delay has to be established. After establishing the transmission delays, an extra step is required in connecting the several radio access units to their transmission cable, for example, which adds extra costs to the installation of the system.

Several attempts have been made to avoid the above unreliable and laborious procedure.

European patent application 0.626.796 discloses a method for synchronizing radio access units or base stations in a multi-cell cordless radio telecommunication system, wherein adjacent base stations are synchronised in a master slave relationship. The radio base stations connect to a central interface unit.

Starting from a first base station, under the control of the central interface unit, a synchronisation signal is transmitted from the first base station for receipt by adjacent base stations. A base station which receives the synchronisation signal from the first base station generates a receive signal and transfers same to the central interface unit. The receive signal comprises information concerning the signal strength level of the received synchronisation signal. The central interface unit evaluates the signal strength levels of the base stations which have received the information signal, if any, and sends a command to a second base station, reporting the highest signal level, for starting a synchronisation procedure at this second base station, to synchronise its transmissions to the transmissions of the first base station.

The second base station next transmits a synchronisation signal for receipt by its adjacent base stations, which will cause the generation of receive signals at other base stations. From an evaluation of the reported signal strength levels, the central interface unit will select a third base station to synchronise its transmission to the transmission of the second base station etc.

At the end of the procedure, at the air interface, base stations are mutually synchronized, however there is no global or common synchronisation between all the base stations at the air interface.

European patent 0.437.835 discloses a frame signal synchronisation system for multiple radio base stations in a Time Division Multiple Access (TMDA) digital mobile communication system, wherein the base stations are provided with delay adjustment means at the link between the radio base stations and the control station or central interface unit to which the base stations connect.

Synchronisation between the base stations is achieved by transmitting a reset pulse from the control station to the base stations, for resetting the TDMA frame generators. To this end, the control station is equipped with synchronous signal generating means, having a delay processor. The delaying means of the base stations are provided with returning means for receiving the reset pulse and returning it immediately to the synchronous signal generating means as a return pulse. The delay processor of the synchronous signal generator means detects the time when the return pulse is received and, on the bases of a period of time defined by the time when the reset pulse is transmitted and the time when it is received, determines a time delay of the delaying means of a particular base station.

Although, at the air interface, a global synchronisation of the base stations of the entire system is achieved, the system according to this European patent comprises a huge signalling overhead, because a reset pulse is send every TDMA frame and the base stations have to be equipped with delaying means capable of transmitting return pulses. In particular in the case of multi-cell radio telecommunication systems wherein hundred or even more radio access units or base stations connect to a central interface unit or control station, a powerful delay processor is required in order to calculate the several link transmission delay times and transmitting same to the relevant delaying means.

In the article "Autonomous Decentralized Inter-Base-Station Synchronisation for TDMA Microcellular Systems", by Yoshihiko Akaiwa, et al., published in CH2944-7/91/0000/0257, 1991, IEEE, p. 257–262, a method for the synchronisation of multiple base stations in a TDMA radio telecommunication system is disclosed, wherein a base station monitors TDMA signals from other base station to measure timing errors and received power levels. The timing errors, which are defined as differences in timings between other base stations and the measuring base station, are averaged with the received power levels as weighing factors. The result is used to correct the timing of the measuring base station. This process is repeated periodically, and is performed at each base station.

With this method, local synchronisation between adjacent base stations can be achieved, however no global synchronisation between all the base stations at the air interface. Further, base stations have to be provided with processing power in order to perform the averaging process, which unduly will raise the costs of such base stations.

European patent application 0.560.079 discloses a method of synchronisation of several base stations from time delays measured over the radio path between adjacent base stations. In order to provide a global (air link) synchronisation, the timing of the base stations is adjusted by a timing adjustment which is for each base station evaluated from estimates of the synchronisation delays between the base stations.

SUMMARY OF THE INVENTION

It is a first object of the present invention to provide a method for calculating transmission time delays at transmission paths between a central interface unit and individual radio access units connecting to the central interface unit of a radio telecommunication system.

It is a further object of the present invention to provide a method for the automatic compensation of the transmission time delays, such to provide global synchronous operation of the radio access units at their air interface.

It is a still further object of the present invention to provide a method for calculating and compensating time delays on a periodic bases, during operation of the radio telecommunication system, and after modifications of the system affecting a transmission time delay or transmission time delays, for example.

These and others objects and advantages are achieved by the present invention in a method for evaluating transmission time delays at transmission paths in a radio telecommunication system between a central interface unit and a plurality of radio access units operatively connecting to said central interface unit, wherein said radio access units transmit radio signals to and receive radio signals from adjacent radio access units relative to their own time base, wherein said transmission time delays are evaluated from time differences between the time of transmission of a radio signal by a radio access unit relative to the time base of said radio access unit and the time of reception of said radio signal by an adjacent radio access unit relative to the time base of said adjacent radio access unit, said time bases being controlled by said central interface unit and lagging said transmission time delays, following European patent application 0,560, 079, whereas the invention is characterized in that said method comprises the steps of:

a) transmitting a first radio signal from a first of said plurality of radio access units at a first point in time relative to the time base of said first radio access unit;

b) receiving said first radio signal by at least a second of said plurality of radio access units at a second point in time relative to the time base of said second radio access unit;

c) transmitting a second radio signal from said second radio access unit at a third point in time relative to the time base of said second radio access unit;

d) receiving said second radio signal by at least said first radio access unit at a fourth point in time relative to the time base of said first radio access unit; and e) calculating from said first, second, third and fourth point in time the relative transmission time delay between the transmission paths from said central control unit and to each of said first and second radio access units.

The transmission and reception times of the radio signal can be indicated relative to the time base of the transmitting or receiving radio access unit while not being synchronized.

Although it is feasible that, for establishing the time differences, the radio access units transfer the transmission and reception times of a particular radio signal to the central control unit or a separate processing unit, in a preferred embodiment of the method according to the invention, the transmitting radio access unit assignees to its radio signal its time of transmission such that the radio access unit receiving the particular radio signal, after establishing the time of reception relative to its time base, can calculate a time difference and transfers this time difference for further processing thereof, for establishing the relative transmission time delays. This, to reduce the signalling overhead compared to a system wherein each radio access unit transfers transmission and reception times for further processing.

In particular for use with a frame controlled telecommunication system, such as a system operating in a TDMA mode, the radio access units can be arranged such to transmit and receive radio signals for the purpose of the present invention relative to a predetermined position of a frame. Further, the radio access units may be arranged to transmit the radio signal at a predetermined position in a frame, such that the time of transmission of the radio signal is known beforehand and needs not to be assigned to the radio signal itself.

A further reduction of the measuring overhead can be established by having the radio access units, under control of the central interface unit, for example, sequentially transmitting their radio signals, such that no identification information has to be adhered to the radio signal, in order to know from which radio access unit a particular radio signal is received.

A radio signal carrying a minimum of information, or such that all information can be deducted from the presence of a radio signal at a radio access unit without having to analyze its information content, is of advantage, in that the radio access units need not to be positioned such that they are within a range necessary for reliable detection of information, such as speech. The speech range of a base station is less than its actual transmission range, due to requirements of maximum bit error rate for a reliable detection of information such as speech.

In order to speed up the processing of the received signals, in a further embodiment of the method according to the invention, only responses from radio access units having received the radio signal with a Received Signal Strength Indication (RSSI) above a certain level are processed for the calculation of the transmission time delays.

Once calculated, the transmission delays can be automatically corrected for in the central interface unit or in each of the radio access units. Correction in the central interface unit is preferred from a cost and control point of view.

With the method according to the invention, the relative transmission time delays can be automatically calculated and compensated without requiring any manual input of delay data and such that the radio access units can immediately be connected to the transmission link means connecting to the central interface unit, thereby providing a significant costs reduction and enhanced reliability compared to the above-described prior art method.

The invention further relates to a radio telecommunication system, comprising a plurality of radio access units operatively connecting to a central interface unit, each radio access unit comprising transceiver means for transmitting and receiving radio signals to and from adjacent radio access units, and time base generator means providing a time base of said radio access unit, wherein said central interface unit comprises means for evaluating transmission time delays at transmission paths between said central interface unit and said plurality of radio access units from time differences between the time of transmission of a radio signal by a radio access unit relative to the time base of said radio access unit and the time of reception of said radio signal by an adjacent radio access unit relative to the time base of said adjacent radio access unit, said time base generator means being controlled by said central interface unit and lagging said transmission time delays, characterized in that said radio access units are arranged for:

a) transmitting a first radio signal from a first of said plurality of radio access units at a first point in time relative to the time base of said first radio access unit;

b) receiving said first radio signal by at least a second of said plurality of radio access units at a second point in time relative to the time base of said second radio access unit;

c) transmitting a second radio signal from said second radio access unit at a third point in time relative to the time base of said second radio access unit;, d) receiving said second radio signal by at least said first radio access unit at a fourth point in time relative to the time base of said first radio access unit; and said radio telecommunication system further comprises e) means for calculating from said first, second, third and fourth point in time the relative transmission time delay between the transmission paths from said central control unit and to each of said first and second radio access units.

The above-mentioned and other features and advantages of the invention are illustrated in the following description with reference to the enclosed drawings.

DETAILED DESCRIPTION OF THE EMBODIMENTS

Without the intention of a limitation, the invention will now be explained by its application in a cordless radio telephone system, such as a radio telephone system operating in accordance with the Digital Enhanced Cordless Telecommunications (DECT) standard, the Personal Handyphone System (PHS) standard or any cordless radio communication protocol, such as designated CT0, CT1, CT3 etc. Further, the invention is also applicable in a mobile radio communication system, such as operating following the Global System for Mobile communications (GSM) standard or any other mobile communications standard.

Figure 1:
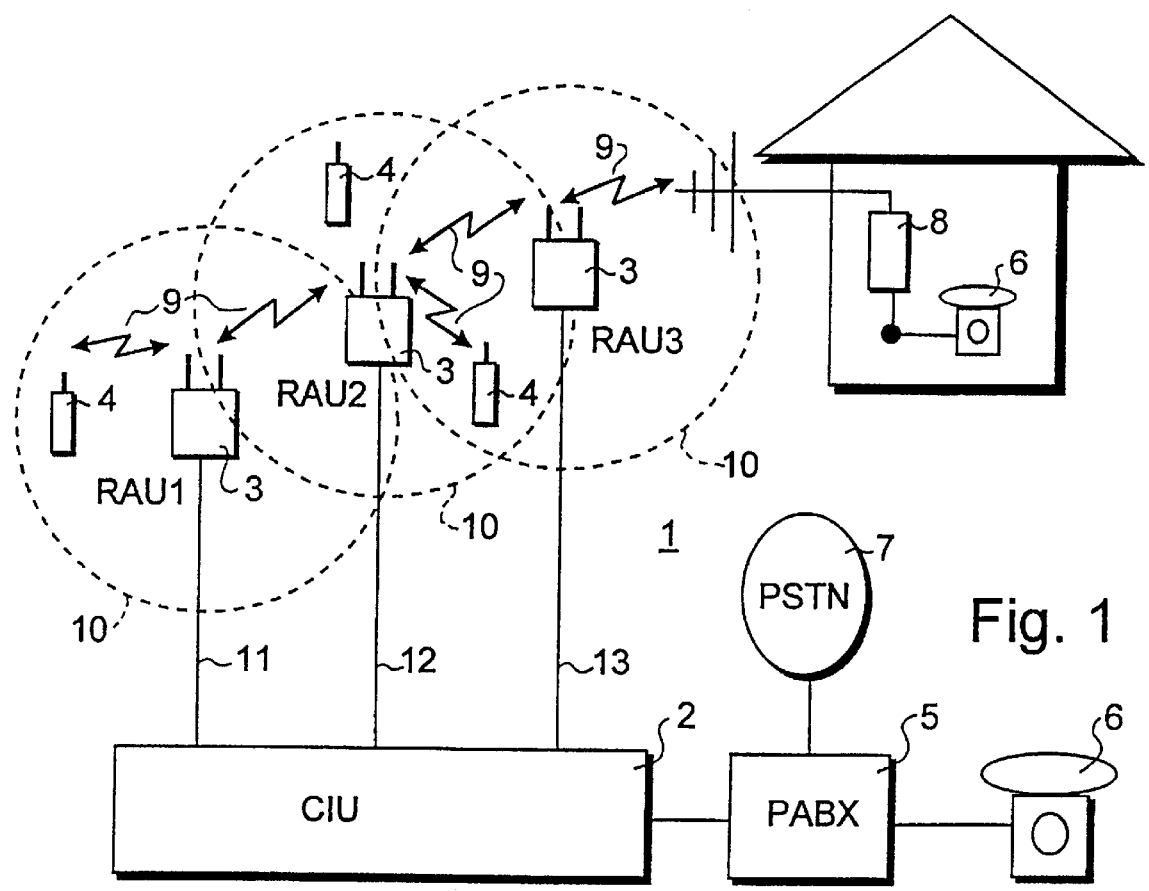
FIG. 1 shows, in a schematic and illustrative manner, a cordless radio telecommunication system operating in accordance with the present invention.

FIG. 1 illustrates a cordless radio telecommunication system, operating in accordance with the present invention, generally designated with reference numeral 1. The system 1 comprises three essential elements: a Central Interface Unit (CIU) or radio exchange 2, a plurality of compact Radio Access Units (RAU's) or base stations 3, which are spread over the area to be covered and connect directly to the CIU 2, and remote cordless or wireless radio terminal devices in the form of portable telephones or handsets 4 which connect over an air interface or radio link 9 to the radio access units 3.

Each radio access unit 3 provides service to a given area, called a cell 10. The cells 10 of the different radio access units 3 are arranged in an overlapping manner, i.e. a so-called multi-cell approach. The radius of indoor cells amounts typically from 10 m–100 m, whereas the radius of outdoor cells typically ranges from 200 m up to 5000 m.

The CIU 2 is connected to a wired exchange 5 to which a plurality of wired telephones 6 can connect. In business environments, this exchange 5 is generally a PABX (Private Automatic Branch eXchange) whereas in outdoor applications, such as Radio in the Local Loop (RLL) or Cordless Terminal Mobility (CTM), the exchange 5 is generally a Local Exchange (LE) which, like the PABX, is connected to a Public Switched Telephone Network (PSTN) or Integrated Services Digital Network (ISDN) 7, i.e. the public telephone and/or data network. The CIU 2 and the wired exchange 5 can be integral.

In RLL or CTM applications, the radio access units 3 may also connect over an air link 9 with so-called (Wireless) Fixed Access Units ((W)FAU) 8 which connect to a fixed telephone terminal or socket for the connection of a wired telephone 6. In CTM or RLL providing local mobility in the home, for example, the (W)FAU 8 is arranged to establish an air link with a handset 4 in the home (not shown).

In practical applications, the transmission links 11, 12, 13 between the radio access units RAU1, RAU2, RAU3 and the central interface unit 2 will have different path lengths. These transmission links can take any suitable form, such as wired cable, coaxial cable, optical fiber cable or a radio link in a true wireless radio telecommunication system. It will be appreciated that information transferred between a radio access unit 3 and the central interface unit 2 will experience a propagation delay, dependent on the length and type of the transmission paths, and delays in transceiver equipment.

Figure 2:
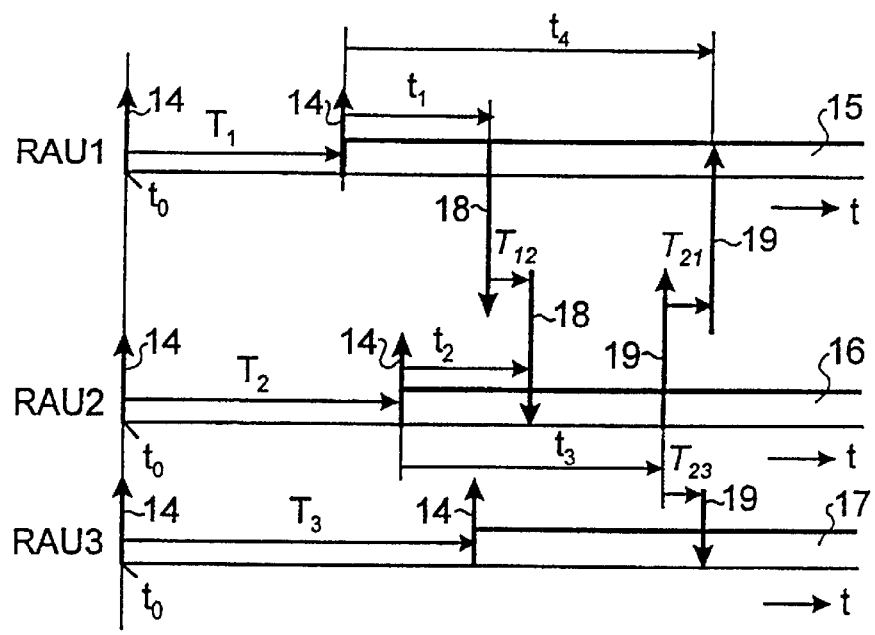
FIG. 2 shows, in a schematic and illustrative manner, transmission time delays in the system of FIG. 1.

FIG. 2 illustrates the effect of the propagation delay on the transmission paths 11, 12, 13. The horizontal axis represents a time axis.

A signal 14, indicated in the form of an arrow, transmitted at to from the central interface unit 2 is received at $t=t_0+T_1$ at RAU1, at $t=t_0+T_2$ at RAU2 and at $t=t_0+T_3$ at RAU3.

$T_1$, $T_2$ and $T_3$ represent the total propagation delay of the signal 14 while travelling to the relevant radio access unit. Note that the delay time values are chosen for illustrative purposes only.

In case the radio access units 3 transmit at the air interface 9 the signal 14 as it is received, it will be clear that the several signals 14 are not synchronously transmitted at the air interface 9. That is, the signal of RAU1 appears first at the air interface, followed by RAU2 and RAU3.

A radio terminal device 4, travelling from the coverage area or cell of RAU1 to the cell of RAU2 will have to synchronise itself to the RAU2 before communication can be handed over from RAU1 to RAU2. This will cause a drop in the communication, unless the radio terminal device is equipped with dual transceiver means.

Further, in the case of a frame type mode of operation of the radio telecommunication system 1, such as operation in accordance with a Time Division Multiple Access (TDMA) mode wherein a frame is subdivided in several time slots, slots of the frame of RAU1, RAU2 and RAU3 can overlap, reducing the overall capacity of the system.

To prevent these disadvantages, the radio access units 3 at the air interface 9 have to operate in a synchronous manner which, besides stable time base generator means in the several radio access units 3, requires also compensation of the time delays experienced at the transmission links 11, 12, 13. Compensation of the transmission time delays $T_1$, $T_2$, $T_3$ can be provided for either at the central interface unit 2 or the radio access units 3. By providing additional propagation time delay at the several transmission paths 11, 12, 13 such that the total delay of each path at least equals the longest transmission delay of the system, all the radio access units 3 will exchange information on the air interface 9 in a synchronous manner.

In accordance with the method of the invention, the differences in the transmission time delays $T_1$, $T_2$ and $T_3$ are established from the relative time difference between the transmission and reception of a radio signal between adjacent radio access units 3. To illustrate this method, reference is first made to FIG. 1.

As can be seen from FIG. 1, radio signals transmitted from RAU1 are received by RAU2, for example. Note that for illustrating purposes, only three radio access units have been shown, whereas in an actual system up till hundred or even more radio access units 3 may connect to a central interface unit 2, such that a radio signal transmitted by RAU1 can be received by other radio access units 3.

Now again referring to FIG. 2. The bold printed solid lines 15, 16, 17 represent the time bases of the respective radio access units RAU1, RAU2, RAU3, respectively. The time base generator means of the radio access units are controlled by the central interface unit, such that the time bases of the radio access units also experience the transmission time delays $T_1$, $T_2$, $T_3$ at the transmission links 11, 12, 13 respectively. Further, a radio signal transmitted by RAU1 is received by RAU2 after an air propagation time delay of $T_{12}$. The indices 1,2 indicate that the radio signal is transmitted from RAU1 and received by RAU2. A radio signal transmitted from RAU2 will be received by RAU1 after a delay $T_{21}$ and also by RAU3 after a time $T_{23}$ (see FIG. 1).

A radio signal 18 transmitted at time $t_1$ from RAU1 relative to its time base 15 will be received by RAU2 relative to its time base 16 after time $t_2$.

A radio signal 19 transmitted by RAU2 at time $t_3$ relative to its time base 16 will be received by RAU1 relative to its time base 15 after time $t_4$.

Relative to the time base of the system, i.e. the central interface unit 2, by substituting the assumed delays $T_1$ and $T_2$, the following expressions are obtained:

$$T_2+t_2=T_1+t_1+T_{12} \qquad (1)$$

$$T_1+t_4=T_2+t_3+T_{21} \qquad (2)$$

Assuming $T_{12}=T_{21}$, and by obtaining information with respect to $t_1$, $t_2$, $t_3$ and $t_4$ the difference in the transmission delays between the transmission paths 11, 12 can be calculated from (1) and (2):

$$T_2-T_1=\tfrac{1}{2}\{(t_1-t_2)-(t_3-t_4)\} \qquad (3)$$

The times $t_1$, $t_2$, $t_3$ and $t_4$ can be separately reported to the central interface unit 2.

Similarly, by comparing the transmission and reception times of radio signals exchanged between RAU2 and RAU3 the relative transmission delay $T_3-T_2$ can be established, etc. Eventually, this results in a table of relative transmission time delays for the complete system 1.

If the delay of a transmission link is known, e.g. because a fixed length of cable is used, all delays of the links between the CIU 2 and each radio access unit 3 can be calculated, i.e. their absolute value. Otherwise, if only relative delays are available, by assuming the delay of one of the links 11, 12, 13 fixed, e.g. $T_1=0$, the transmission delays relative to this assumed time delay can be calculated. Note that a + sign denotes a time lag and a − sign represents a time lead with respect to $T_1$. By comparing the thus obtained values and by compensating all the transmission links between the CIU 2 and the radio access units 3 such that they are at least equal to the largest delay, all radio access units 3 will transmit and receive at their air interface 9 in a global synchronous manner. That is, global to the system 1.

If two or more systems have to be synchronized, the process has to be extended, such to obtain relative delays of adjacent radio access units corresponding to different systems.

Instead of providing all the timing information to the central interface unit 2, which will cost transmission overhead, the time of transmission of a radio signal 18, 19 from a radio access unit 3 can be transmitted with the radio signal, such that a receiving access unit 3 can establish the time difference between transmission and receipt of a particular radio signal, i.e. $t_1-t_2$ and $t_3-t_4$.

In the case of a TDMA radio telecommunication system, the starting point of a frame can be used as internal time base reference, for example. Note that for the purpose of the present invention the system initially does not have to operate synchronous at the air interface 9.

The radio access units 3 can be arranged such that the radio signal is always transmitted at a fixed position in a frame. Note that more than one radio signal may be transmitted in the same frame. The predetermined position can be chosen as the first slot in the frame or any other position which can be determined.

Figure 3:
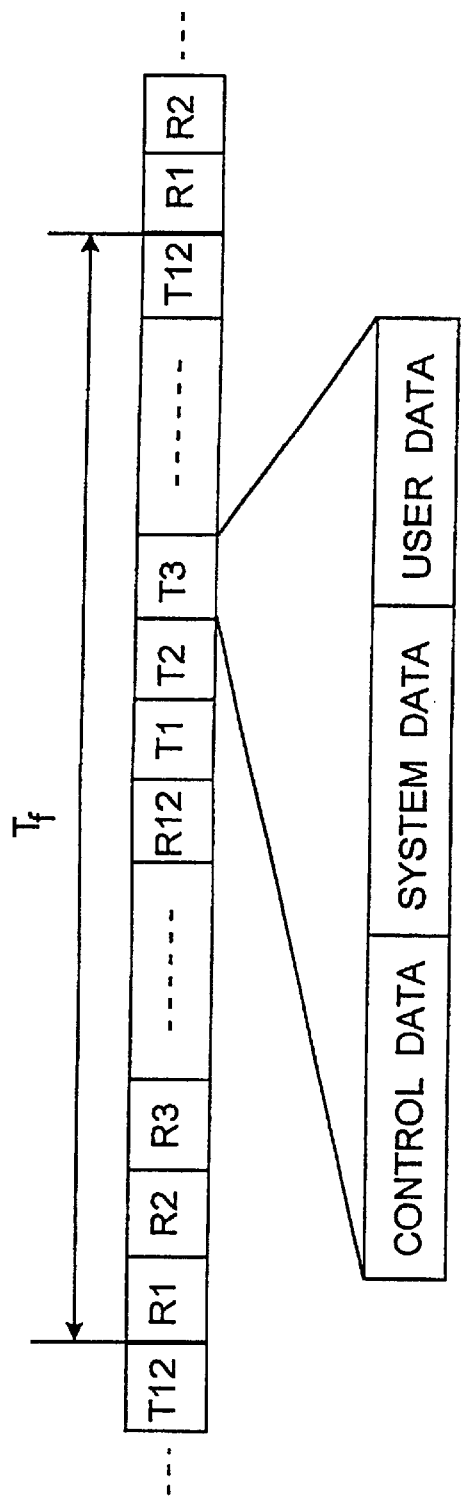
FIG. 3 shows, in a schematic and illustrative manner, a digital data stream in accordance with the Digital Enhanced Cordless Telecommunication (DECT) standard.

For clarification purposes, FIG. 3 shows the frame structure used in DECT. DECT operates in accordance with a TDMA/TDD (Time Division Duplex) protocol, wherein the first half of a frame is used for transmission and the other half of the frame is used for reception purposes, or vice versa. A DECT frame comprises twenty-four time slots as shown in FIG. 3. During the first half of the frame, i.e. the first twelve time slots designated R1, R2, . . . R12, data transmitted from the radio access units 3 are received by the handsets 4 or (W)FAU 8, whereas in the second half of each frame 13, i.e. the second twelve time slots designated T1, T2, . . . T12, the remote terminal units 4 or 8 transmit data to the radio access units 3. A radio communication link between a radio access unit 3 and a remote terminal unit 4 or 8 is assigned a slot in the first half of the frame and a slot bearing the same number in the second half of the frame. Each time-slot typically contains control data, system data and information or user data. In DECT, multiple time-slots may be assigned to a particular radio link 9.

Figure 4:
FIG. 4 shows, in detail, the structure of a time slot of the data stream of FIG. 3.

A more detailed time-slot structure is shown in FIG. 4. The control data field contains a so-called synchronisation (SYNC) word, which has to be correctly identified at a radio access unit 3 or a remote terminal unit 4, 8 in order to process the received data. SYNC data will typically needs 16 bits, proceeded by a preamble of 16 bits.

The system data field contains system information on identity and access rights, services availability and, if required, information for handover to another communication channel in case of disturbances or transfer of a call to another radio access unit. Also paging and calls set up procedures are carried over the system data field, which is also called A-field. System data will typically need 64 bits with a 16 bit Cyclic Redundancy Checkword designates ACRC.

The information or user data, also called B-field, comprise in case of a telephone call digitised speech examples obtained during the frame cycle time $T_f$ of 10 ms. The speech samples are coded having a typical bit rate of 32 kb/s. This means that for each speech call 320 bits have to be transmitted and received during each frame.

The B-field date is scrambled and a 4 bit Cyclic Redundancy Checkword, designated XCRC, is formed from the information data. Including guard space, the total number of bits per time-slot according to the DECT standard amounts to 480. These bits are transmitted at a system clock frequency or system bit rate of 1152 kb/s.

In DECT, ten carriers are available for the transmission of information, resulting in a total of 120 duplex radio channels. DECT radio communication networks may comprise several DECT radio communication systems 1, which can be independently operated by one or more operators, for example. Further, several DECT radio communication systems 1 may be operated independently in the same geographical area.

The radio signal for the purpose of the present invention can be transmitted, for example, in the A-field of a predetermined time-slot, for example time-slot 1 of each frame. In such cases, the relevant time of transmission of a radio signal is known, such that only the time of reception of a radio signal has to be transferred for the calculation of the transmission time delays $T_1$, $T_2$, $T_3$ etc. In the above mentioned cases, it is assumed that a radio access unit which receives a radio signal can identify the source of the information, i.e. the transmitting radio access unit. For DECT and other known TDMA radio telecommunication systems, this is no constraint because the identification data is always present in either a system or a control data field of the frame. However, obtaining the identification information from the frame requires reception of data not exceeding a certain bit error rate which puts a limitation on the distance between radio access units, which should be within in the coverage area for data transmission, i.e. speech transmission for example.

The need for the receipt of identification data or the like can be avoided by, under the control of the central interface unit 2, for example, having the radio access units 3 sequentially transmitting a radio signal for the purpose of establishing transmission time delays. A receiving radio access unit does not need to know from which radio access unit it receives the radio signal. This information is known at the central interface unit 2. Accordingly, the receiving radio access unit only needs to report its time of receipt from which—and the predetermined time of transmission of each radio access unit—the central interface unit 2 or any other processing unit can calculate the relative transmission time delays.

Radio signals, not requiring a particular bit error rate, can be received at a greater distance, such that the radio access units 3 can be installed with a distance to cover optimally the area of interest and such that handovers can be made for a remote radio communication unit such as a radio telephone 4 moving across the coverage area from one cell 10 to the other, for example.

Figure 5:
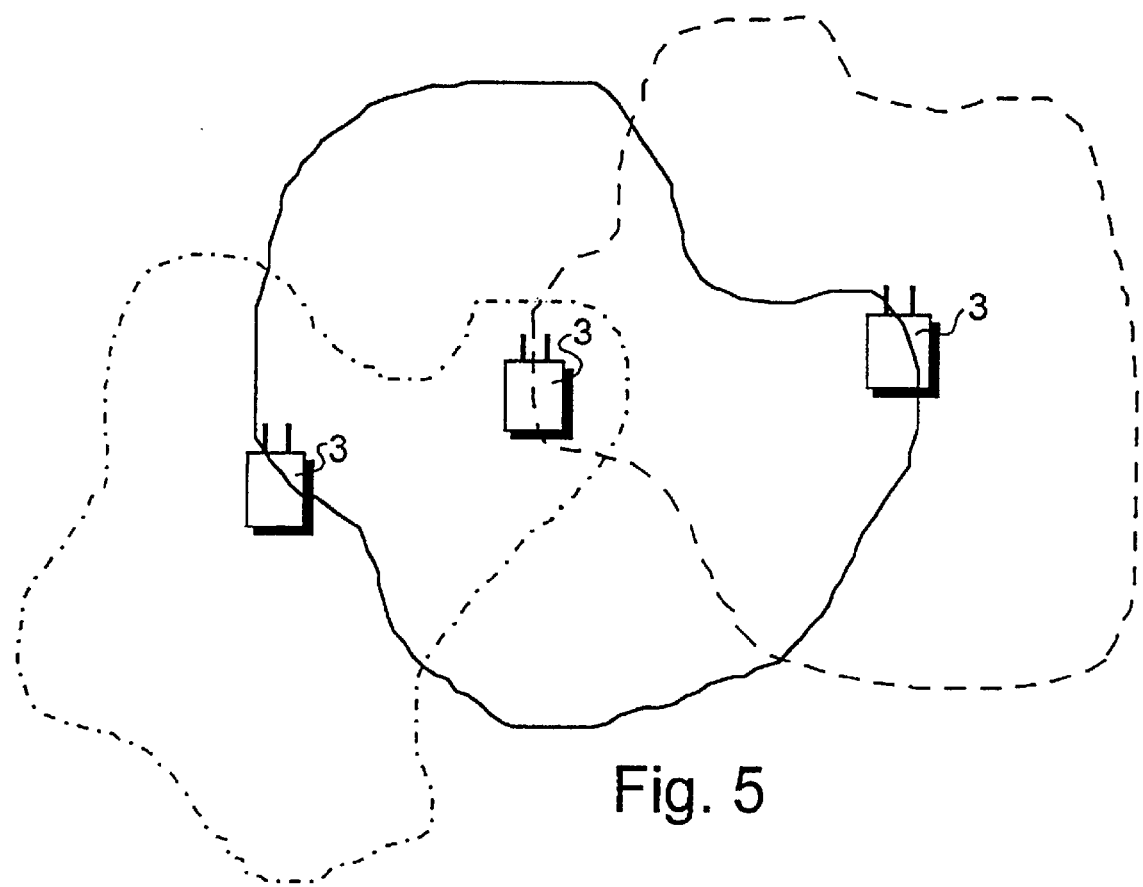
FIG. 5 shows, in a schematic and illustrative manner, an example of transmission cells encountered in practice.

FIG. 5 shows an actual coverage pattern of a radio telecommunication system, from which it is clear that the method according to the invention will not impose additional restrictions on the positioning of the radio access units 3.

If neighbouring radio access units can not receive each other, there is most probably no need for mutual compensation of transmission time delays, because no handovers can be made within the coverage area of the system. This can be, for example, also the case if the system contains clusters of remote radio access units, such that between clusters no handover is possible.

Whether a received radio signal is suitable for use with the present invention, a Received Signal Strength Indication (RSSI) value can be obtained at the receiving radio access units, and such that only signals having a strength above a certain level will be used for the purpose of the present invention. This not only speeds up the process as a whole, but also enhances its reliability.

The method according to the invention can be used not only after the installation of a new system, but also during it operation, after maintenance or the repair of failures, or the addition of new radio access units. An additional advantage of the method according to the invention is in that if a radio access unit does not respond, this can be an identification of an alleged malfunctioning and can be reported to an operator.

Figure 6:
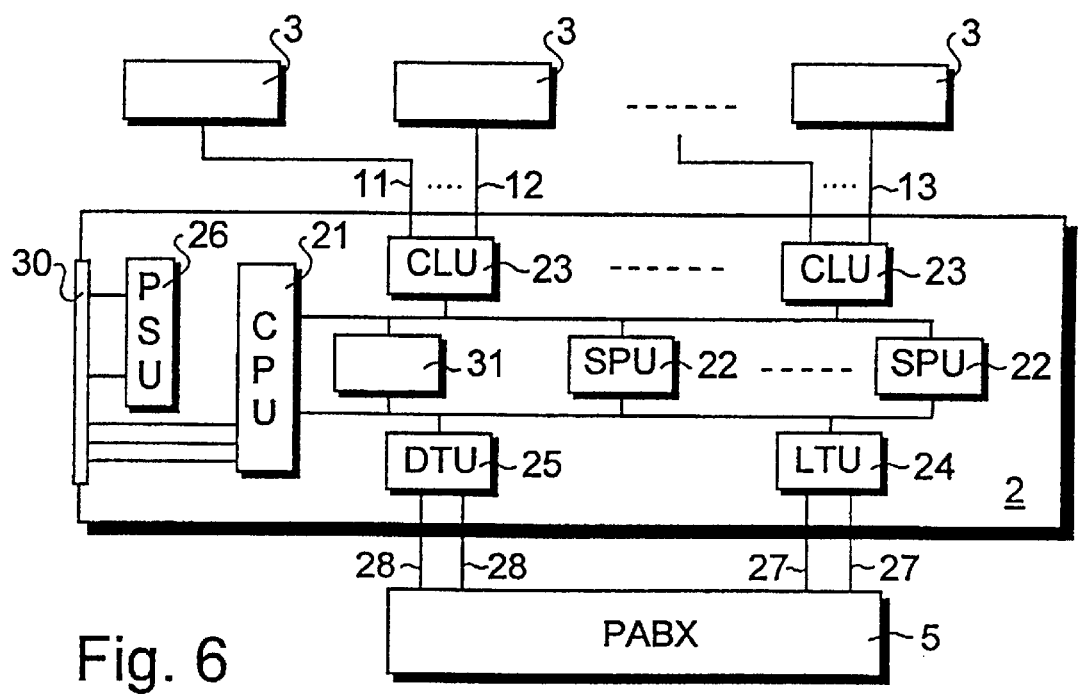
FIG. 6 shows a simplified block diagram of a central interface unit operating in accordance with the present invention.

FIG. 6 shows a functional block diagram of an embodiment of a central interface unit 2 for use with the present invention.

The CIU 2 comprises a housing 20 containing a Central Processing Unit (CPU) 21, Speech Processing Units (SPU)

22, Cell Link Units (CLU) 23 and Line Termination Units (LTU) 24 and/or Digital Trunk Units (DTU) 25. The several units are connected to a digital system bus 29, and are powered by a Power Supply Unit (PSU) 26.

The LTU's 24 provide an analogue interface between the PABX 5 and the CIU 2. Each LTU 24 comprises a number of line termination circuits, each of which interfaces to the PABX 5 through a 2-wire analogue subscriber line 27. Every analogue line 27 is dedicated to a specific handset 4 or (W)FAU 8 (FIG. 1), i.e. a specific telephone number. The main tasks of an LTU are: to establish a physical connection between the PABX and the CIU, on/of hook detection, ring signal detection, and analogue to digital speech processing (PCM) and vice versa.

The DTU 25 provides a digital interface between the PABX 5 and the CIU 2. Each DTU 25 contains a number of digital trunk circuits. Each digital trunk circuit supports a Channel Associated Signalling (CAS) interface. In the embodiment shown, each CAS interface provides thirty fixed 64 kb/s digital communication channels, to which thirty subscribers are assigned; i.e. a 2 Mb/s dataline 28. Dependent on the type of the PABX 5 a number of the functions of an LTU may also have to be performed by a DTU.

In a practical embodiment of the CIU 2 described above, up to 600 subscribers can be connected to one CIU 2. This means that the connection between the CIU 2 and the PABX 5 has to support up to 600 analogue 2-wire lines in case of LTU's 24, or a 40 Mb/s digital data link in case of DTU's 25. For control purposes an interface 30 is provided.

In accordance with the invention, the CIU 2 comprises means 31 for the control of the radio access units 3, such to transmit radio signals and to receive transmitted radio signals, and to store and process received time information of the radio access units 3 for the calculation of the transmission time delays at the links between the CIU 2 and the radio access units 3. In the preferred embodiment, the CLU's 23 are arranged to compensate for the transmission time delays $T_1$, $T_2$, $T_3$ etc.

Figure 7:
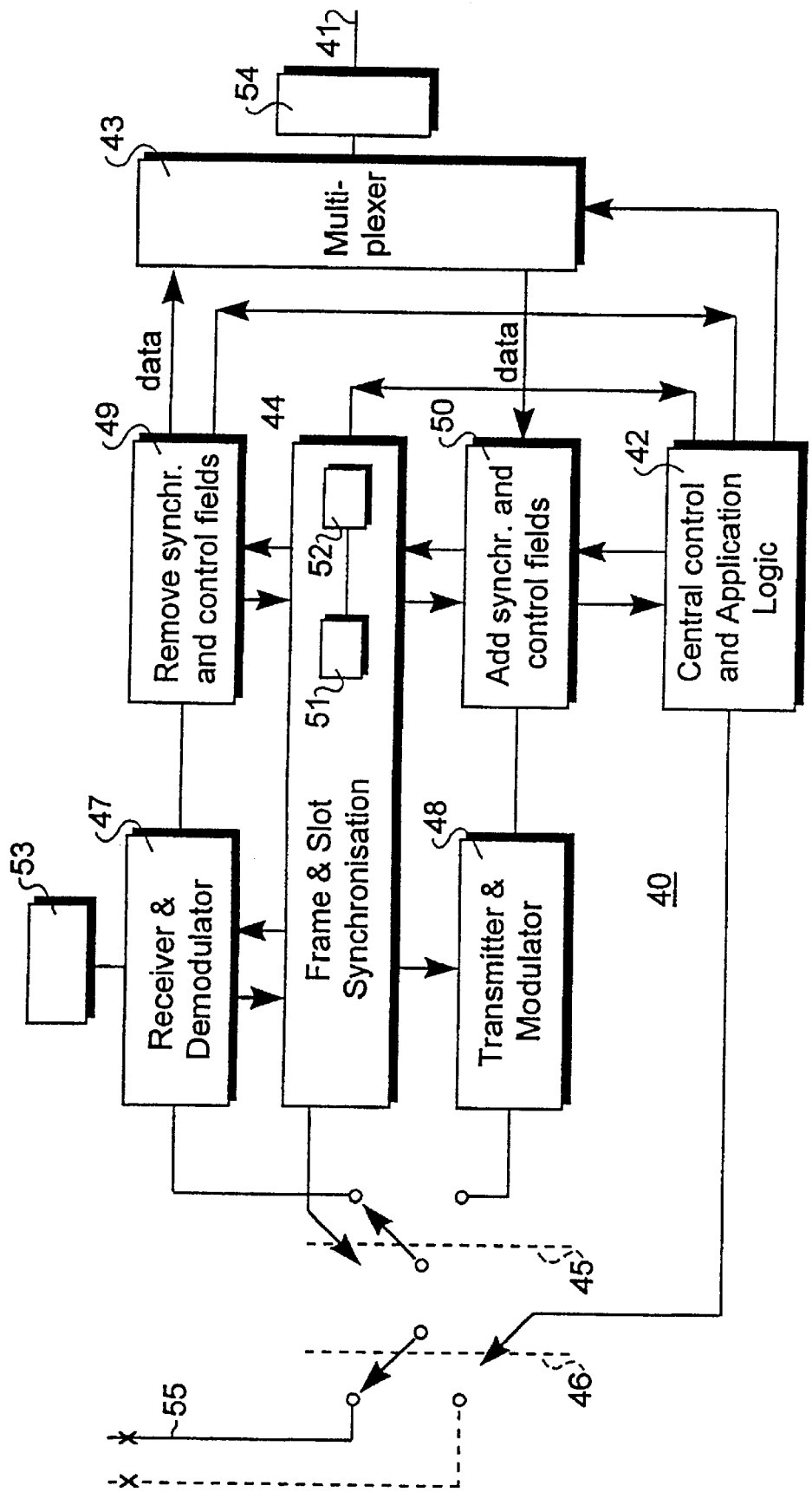
FIG. 7 shows a simplified block diagram of a radio access unit operating in accordance with the present invention.

FIG. 7 shows a block diagram of a radio access unit 40 which operates in accordance with the present invention. The radio access unit 40 has a wired connection 41 to a central interface unit 2, shown in FIG. 1. Central control and application logic 42 detects incoming calls and controls outgoing calls and selects suitable combinations of carrier and time-slots. The different connections and time-slots are merged via a multiplexer 43. The radio access unit 40 has a frame and a slot synchronisation unit 44 which controls slot reception and transmission timing. The central control logic 42 also controls a Transmit/Receive (T/R) switch 45 and an antenna diversity switch 46, if antenna diversity is implemented. With antenna diversity, two antennas are provided at a radio access unit and, if a radio connection provides no good communication, the control logic first tries the other antenna before changing the radio communication channel.

The receiver means of the radio access unit 40 consists of a receiver/demodulator 47 and a transmitter/modulator 48. Synchronisation and control information is stripped from received data by unit 49, whereas such information is added to the data to be transmitted by unit 50, connected as shown.

The frame and slot synchronisation unit 44 is controlled such to support handover in case of moving remote radio communication terminals 4 (FIG. 1).

The frame and slot synchronisation unit 44 comprises time base generator means 51 and means 52 for measuring the time of reception of a received radio signal, e.g. counter means clocked by the time base generator means 51. The measuring means 52 are operative such that transmission delays in the radio access unit itself are compensated for. The time of reception of radio signals are measured with respect to the time base generator means 51. The signal strength of received radio signals RSSI is measured by means 53. The measured and/or received timing information and RSSI values are, under the control of the central control and application logic 42 processed and transferred to the central interface unit 2 or another processing unit for the purpose of the present invention.

As indicated with broken lines, the radio access unit 40 may be provided with delay compensation means 54, in order to compensate for the transmission time delays at the transmission links between the radio access units 3 and the central interface unit 2.

What is claimed is:

1. A method for evaluating transmission time delays at transmission paths in a radio telecommunication system between a central interface unit and a plurality of radio access units operatively connected to said central interface unit, wherein said radio access units transmit radio signals to and receive radio signals from adjacent radio access units relative to their own time base, wherein said transmission time delays are evaluated from time differences between a time of transmission of a radio signal by a radio access unit relative to the time base of said radio access unit and a time of reception of said radio signal by an adjacent radio access unit relative to the time base of said adjacent radio access unit, said time bases being controlled by said central interface unit and lagging said transmission time delays, said method comprises the steps of:

a) transmitting a first radio signal from a first of said plurality of radio access units at a first time relative to the time base of said first radio access unit;

b) receiving said first radio signal by a second of said plurality of radio access units at a second time relative to the time base of said second radio access unit;

c) transmitting a second radio signal from said second radio access unit at a third time relative to the time base of said second radio access unit;

d) receiving said second radio signal by said first radio access unit at a fourth time relative to the time base of said first radio access unit; and e) calculating from said first, second, third and fourth time a relative transmission time delay between the transmission paths from said central control unit to each of said first and second radio access units.

2. A method according to claim 1, wherein a radio access unit, relative to the time base of said radio access unit, assigns to a radio signal the time of transmission of said radio access unit and establishes for a received radio signal the time of reception of said received radio signal.

3. A method according to claim 2, wherein a radio access unit, of a particular radio signal, transfers said reception and transmission time to said central interface unit for calculating said transmission time delays.

4. A method according to claim 2, wherein a radio access unit, of a particular radio signal, calculates a time difference between said transmission and reception time and transfers said time difference to said central interface unit for calculating said transmission time delays.

5. A method according to claim 1, wherein said radio telecommunication system operates in a frame controlled mode, such as a Time Division Multiple Access mode, wherein said transmission and reception time are relative to a predetermined position in a frame.

6. A method according to claim 1, wherein said radio access units, under control of said central interface unit, sequentially transmit said radio signals.

7. A method according to claim 1, wherein for the calculation of said transmission time delays only received radio signals are used having a Received Signal Strength Indication above a predetermined level.

8. A method according to claim 1, wherein said transmission time delays are calculated at installation of the system, during operation thereof on a periodic basis, in case of malfunctioning, at installation of a further radio access unit and after amendments of the installed system affecting said transmission time delays.

9. A method according to claim 1, wherein said radio telecommunication system comprises a plurality of central interface units, to each of which connects a plurality of radio access units, wherein said transmission time delays are also calculated from said transmit and receive time of radio signals transmitted and received between adjacent radio access units operatively connected to different central interface units.

10. A method according to claim 1, wherein transmissions between said central interface unit and said plurality of radio access units connecting to said central interface unit are compensated by said calculated transmission time delays.

11. A radio telecommunication system, comprising a plurality of radio access units operatively connected to a central interface unit, each radio access unit comprising transceiver means for transmitting and receiving radio signals to and from adjacent radio access units, and time base generator means providing a time base of said radio access unit, wherein said central interface unit comprises means for evaluating transmission time delays at transmission paths between said central interface unit and said plurality of radio access units from time differences between a time of transmission of a radio signal by a radio access unit relative to the time base of said radio access unit and a time of reception of said radio signal by an adjacent radio access unit relative to the time base of said adjacent radio access unit, said time base generator means being controlled by said central interface unit and lagging said transmission time delays said radio telecommunication system being arranged for:
  a) transmitting a first radio signal from a first of said plurality of radio access units at a first time relative to the time base of said first radio access unit;
  b) receiving said first radio signal by a second of said plurality of radio access units at a second time relative to the time base of said second radio access unit;
  c) transmitting a second radio signal from said second radio access unit at a third time relative to the time base of said second radio access unit;
  d) receiving said second radio signal by said first radio access unit at a fourth time relative to the time base of said first radio access unit;
  e) said radio telecommunication system further comprises means for calculating from said first, second, third and fourth time a relative transmission time delay between the transmission paths from said central control unit and to each of said first and second radio access units.

12. A radio telecommunication system according to claim 11, wherein said radio access units comprise means for transferring said transmission and reception time to said central interface unit.

13. A radio telecommunication system according to claim 11, wherein a radio access unit comprises means for calculating a time difference between the time of reception and the time of transmission of a particular radio signal, and means for transferring said calculated time difference to said central interface unit.

14. A radio telecommunication system according to claim 11, wherein a radio access unit comprises means for assigning to said radio signals said transmission and reception time relative to the time base of said radio access unit.

15. A radio telecommunication system according to claim 11, arranged to operate in a frame controlled mode, such as a Time Division Multiple Access mode, wherein a radio access unit comprises means for transmitting and receiving said radio signals relative to a predetermined position of a frame.

16. A radio telecommunication system according to claim 11, wherein said central interface unit comprises means for controlling transmission of said radio signals by said radio access units, means for receiving time information from radio access units in response to the transmission of a radio signal by a radio access unit and means for calculating said transmission time delays from said received time information.

17. A radio telecommunication system according to claim 11, wherein said radio access units comprise means for determining a Received Signal Strength Indication, arranged such that received radio signals having an RSSI above a predetermined level are processed for calculating said transmission time delays.

18. A radio telecommunication system according to claim 11, wherein said central interface unit comprises means for compensating calculated transmission time delays at the transmission paths between said central interface unit and a radio access unit operatively connected to said central interface unit.

19. A radio telecommunication system according to claim 11, wherein a radio access unit comprises means for compensating calculated transmission time delays at its transmission path to said central interface unit.

* * * * *